United States Patent [19]

Othon

[11] Patent Number: 5,078,815
[45] Date of Patent: Jan. 7, 1992

[54] METHOD OF MAKING A DECORATIVE TRANSPARENT LAMINATE OF STONE AND GLASS

[76] Inventor: Robert S. Othon, 8840 Greenback La., #101, Orangevale, Calif. 95662-4019

[21] Appl. No.: 535,664

[22] Filed: Jun. 11, 1990

[51] Int. Cl.⁵ .................... B44C 5/08; B44F 1/06
[52] U.S. Cl. .................... 156/63; 156/154; 156/256; 156/268; 125/1; 428/38
[58] Field of Search .......... 156/63, 153, 154, 268, 156/256, 250; 428/15, 38, 542.2; 125/1, 25, 35; 65/174; 83/880

[56] References Cited

U.S. PATENT DOCUMENTS

| | | | |
|---|---|---|---|
| 386,062 | 7/1888 | Durrin | 428/15 X |
| 1,586,114 | 5/1926 | Pence | 428/15 X |
| 2,126,725 | 8/1938 | Briant et al. | 125/1 |
| 3,097,080 | 7/1963 | Weir | 428/15 X |
| 3,723,233 | 3/1973 | Bourke | 125/1 X |
| 4,404,158 | 9/1983 | Robinson | 428/15 X |
| 4,664,955 | 5/1987 | Clem | 428/15 |
| 4,822,661 | 4/1989 | Battaglia | 428/116 |
| 4,855,177 | 8/1989 | Leis | 428/15 X |
| 4,957,785 | 9/1990 | Fornadley | 156/63 X |
| 5,004,512 | 4/1991 | Fodera | 156/153 |

*Primary Examiner*—Michael W. Ball
*Assistant Examiner*—Jeff H. Aftergut
*Attorney, Agent, or Firm*—Thomas R. Lampe

[57] ABSTRACT

A method of making a decorative, transparent laminate comprised of a thin layer of stone bonded by an adhesive to a transparent, rigid substrate material.

6 Claims, 2 Drawing Sheets

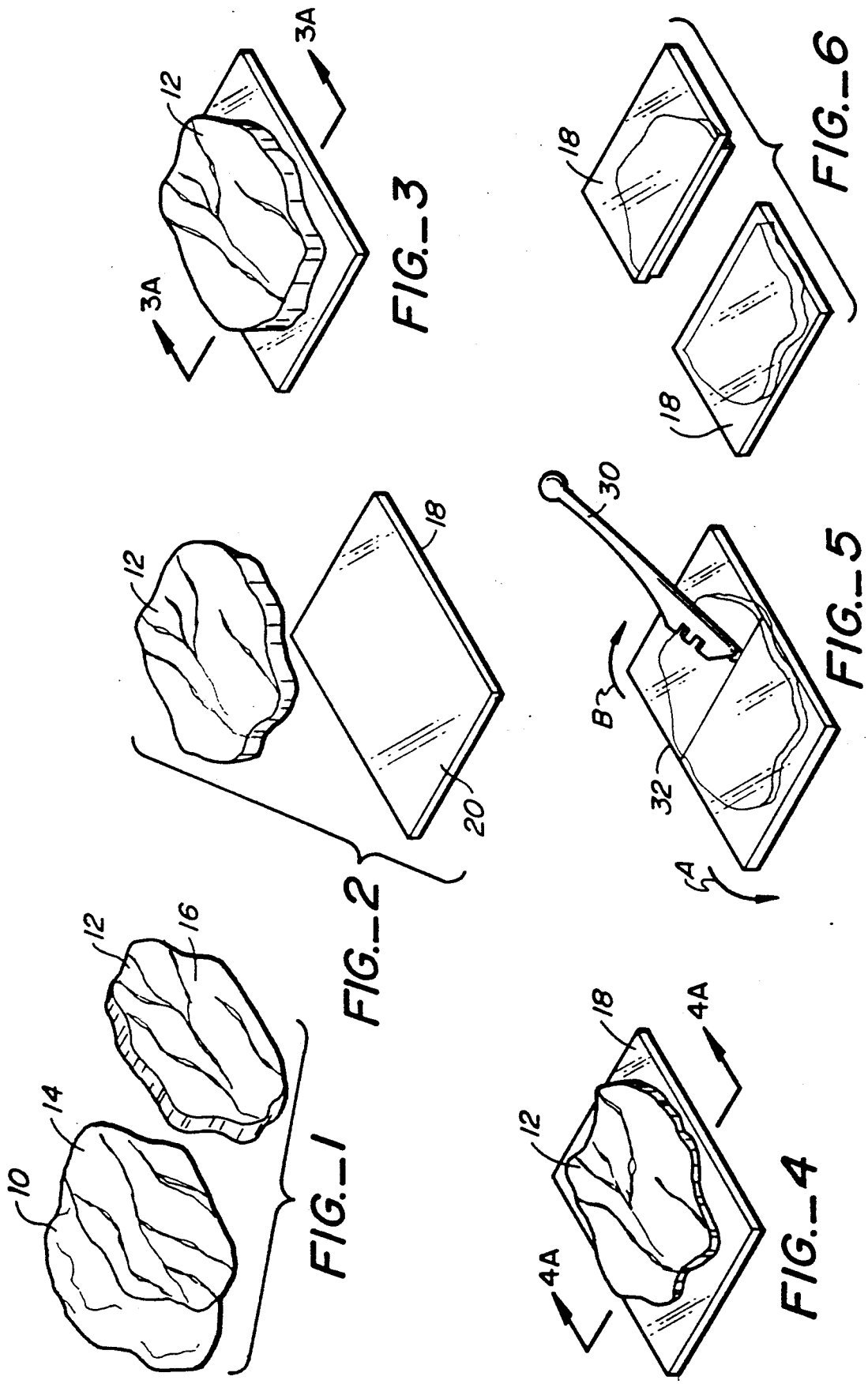

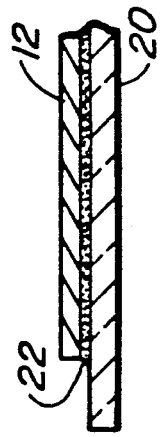
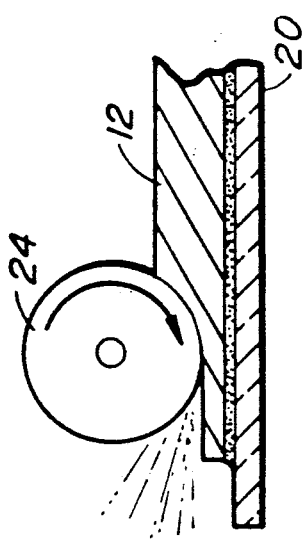
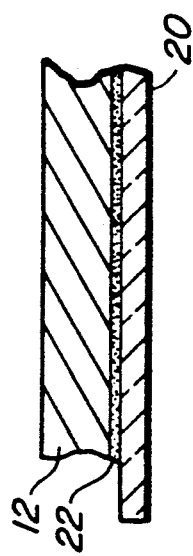
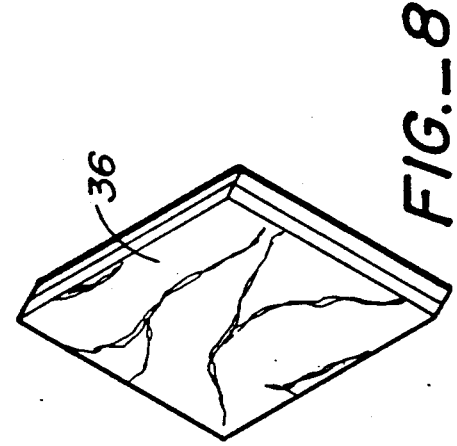
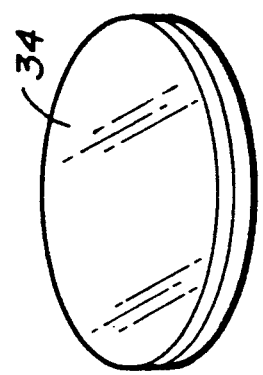

METHOD OF MAKING A DECORATIVE TRANSPARENT LAMINATE OF STONE AND GLASS

TECHNICAL FIELD

This invention relates to a method of making a decorative, transparent laminate comprised of a thin layer of stone bonded to a transparent, rigid substrate material. The method has particular application in the production of stained-glass windows and the like.

BACKGROUND ART

Although not a widespread practice, it is known in the stained-glass art to employ in windows, panels and similar works various types of rocks or stones which contribute to the beauty and esthetics of the completed art-work.

Certain stones and rocks, however, have been excluded from use in stained-glass applications because they lack sufficient strength and structural integrity to enable them to be worked thin enough to permit the passage of light therethrough. For example, many of the softer rocks or stones, such as alabaster and soapstone, can not be effectively employed because they will crumble or break before they can be worked as by grinding or cutting to a desired degree of thinness. Many hard rocks are also unusable for stained-glass applications because they are brittle or have fracture lines.

BRIEF SUMMARY OF THE INVENTION

The method of the present invention allows rocks or stones to be worked to a thinness which will impart a desired degree of transparency thereto, regardless of the inherent strength or density of the stone. The method produces a laminate incorporating the stone which has a high degree of structural integrity, thereby permitting installation thereof into a stained-glass work such as a window, panel or the like. Furthermore, the laminate may be shaped as desired before installation in accordance with the wishes of the artisan.

According to the method of the present invention, a stone is worked to form a substantially flat surface thereon. An adhesive is then positioned between the substantially flat surface of the stone and the substantially flat surface of a transparent, rigid substrate material, such as glass.

The substantially flat surfaces of the substrate material and the stone are then brought into engagement with the adhesive therebetween. A bond is then formed between the substantially flat surfaces of the substrate material and the stone by means of the adhesive.

After the bond is formed, the stone is further worked, as by grinding or cutting, to reduce the thickness of the stone and increase the transparency of the stone.

Other features, advantages, and objects of the present invention will become apparent with reference to the following detailed description and accompanied drawings.

BRIEF DESCRIPTION OF DRAWINGS

FIG. 1 is a perspective view of a large stone which has been cut to form two separate stones, each of which has at least one substantially flat surface thereon;

FIG. 2 is a perspective view illustrating one of the stones of FIG. 1 prior to its application to a substrate;

FIG. 3 is a perspective view illustrating the stone and substrate material of FIG. 2 in engagement;

FIG. 3A is an enlarged sectional view showing the stone and substrate material of FIG. 3 and taken along the line 3A—3A;

FIG. 3B is a view similar to FIG. 3A but illustrating the stone being worked to reduce the thickness thereof;

FIG. 4 is a perspective view of the laminate including the stone and substrate material after the stone has been worked as shown in FIG. 3B;

FIG. 4A is an enlarged sectional view showing a portion of the laminate and taken along the line 4A—4A in FIG. 4;

FIG. 5 is a view of the laminate and illustrating the scoring of same to shape the laminate;

FIG. 6 illustrates the laminate after it has been severed along the score line produced by the method step illustrated in FIG. 5; and FIGS. 7 and 8 are perspective views of laminates produced according to the teachings of the present invention having different shapes.

BEST MODE FOR CARRYING OUT THE INVENTION

The first step of the method of the present invention is working a stone to form a substantially flat surface thereon. In FIG. 1 a large stone has been cut, as by sawing or the like, into two separate stones 10 and 12, both of which have at least one substantially flat surface thereon. Stone 10 has a substantially flat surface 14. Stone 12 has a substantially flat surface 16 where a prior cut was made and a corresponding substantially flat surface (not shown) on the other side thereof caused by the cut severing stones 10 and 12 from one another.

Even relatively soft rocks or stones like soapstone, alabaster, sandstone, and the like may be cut by sawing as long as the severed portions of the stone remain relatively thick. If a minimum degree of thickness is not maintained, however, may types of stones will not have sufficient structural integrity and will readily crumble or break.

A problem presents itself when soft stones and rocks are to be employed in a stained-glass environment wherein a degree of transparency is desired. Quite simply, many soft stones and rocks are not employed for this purpose simply because they cannot be worked to provide the degree of transparency required by the artisan. The present invention solves this problem.

The next step in the method of the invention is to position an adhesive between the substantially flat surface of a stone and a substantially flat surface of a rigid substrate material. FIG. 2 illustrates one suitable form of rigid substrate material, namely a panel of glass 18. A suitable adhesive is applied to a substantially flat surface 20 of the glass panel 18 so that the adhesive is positioned between the substantially flat surfaces of the substrate material and the stone. In FIG. 2 the stone is stone 12, although of course, it could be stone 10, if desired.

The next step is shown in FIGS. 3 and 3A wherein the substantially flat surfaces of the substrate material and the stone are brought into engagement with the adhesive therebetween.

In FIG. 3A the adhesive is identified by reference numeral 22. While any suitable adhesive may be employed, adhesives found particularly useful are ultraviolet light-actuated adhesives and epoxy adhesives. An example of a suitable ultraviolet light-actuated adhesive is Duro Crystal Clear adhesive made available by Loctite Corp., Cleveland, Ohio, and an example of a suitable epoxy adhesive is DP-270 clear adhesive made available by 3M Adhesives, St. Paul, Minnesota. Since the adhesive 22 is not directly exposed to the ambient atmosphere when sandwiched between the substrate material and the stone, use of an adhesive which relies on exposure to the ambient atmosphere to complete dry is undesirable. With ultraviolet light-actuated adhesives and epoxy adhesives this lack of exposure to the ambient atmosphere is not a problem and drying will take place in any event.

Virtually all soft stones and rocks define voids at the substantially flat surface thereof, and according to the teachings of the present invention, the adhesive should be of sufficient thickness to enter and fill at least some of the voids when the substrate material and stone are brought into engagement. This action may be facilitated by exerting opposed pressing forces at the substrate material and the stone.

The present invention also encompasses the possibility of adding a colorant of any suitable type to the adhesive 22 before the substrate material and the stone are brought together. The addition of colorant can, in some cases, enhance the beauty and definition of the resultant decorative laminate.

After a bond is formed between the substantially flat surfaces of the substrate material and the stone with the adhesive, the stone is further worked to reduce the thickness of the stone and increase the transparency of the stone. FIG. 3B illustrates one method of further working the stone wherein a cylindrically-shaped grinder 24 is rotated while it gradually traverses the length of the stone. Other forms of further working may be employed, such as the use of a saw to cut stone 12 transversely to reduce the thickness thereof. The main point is that the stone 12, even if soft and weak structurally, can be further worked in a variety of ways to reduce its thickness and increase its transparency after the stone has been bonded to the rigid substrate material, such as glass, plastic or the like. A soft or weak rock or stone so further worked in the absence of such support would readily break apart or crumble. The fact that some of the adhesive has worked itself into voids in the stone further contributes to the structural stability of the stone.

FIGS. 4 and 4A illustrate the resultant laminate after the stone has been further worked by cutting, grinding or the like. If desired, the outer surface of the stone may be polished to further enhance its beauty. In any event, further working of the stone results in the thickness thereof being reduced and the transparency thereof being increased.

The laminate may now be cut to any desired shape. FIG. 5 illustrates one approach for making a cut. Specifically, the stone-adhesive-glass laminate is scored by applying a conventional glass cutting tool 30 to form a score line 32 in the glass. Of course, such score line may be of any desired configuration. Pressure is then exerted on the glass at spaced locations thereon on opposed sides of the score line. This will cause the glass to break along the score line and move in the directions of arrows A, B. The stone, being bonded to the glass by the adhesive, also will substantially simultaneously break along the score line 32. FIG. 6 shows the resultant broken-away pieces of the laminate.

FIGS. 7 and 8 are laminates constructed in accordance with the teachings of the present invention which have been cut or shaped into shapes other than rectangular. The laminate 34 of FIG. 7 is in the form of a circle and the laminate of 36 is diamond-shaped. The laminate produced by the method of the present invention may be worked into a wide variety of shapes at the will of the artisan since the laminate structure has a high degree of structural integrity. Rather than employing a glass cutter to shape the laminate structure, other cutting devices such as saws, sand blasters, water blasters and the like may be employed. In fact, such alternative cutting devices may be necessary when cutting more complex shapes.

Referring once again to FIG. 1, it will be appreciated that it is not necessary that a stone with two flat sides be the stone worked in accordance with the teachings of the present invention. It is only necessary that the stone have one flat side which is adhesively secured to the rigid substrate material. For example, a whole stone may be cut at one end to form a flat surface thereon. Next, the flat surface is adhesively affixed to the rigid substrate material. The stone may then, if desired, be cut into slices, much like one would slice bread, in order to attain the desired thickness. This working technique may, if desired, be supplemented by grinding.

I claim:

1. A method of making a decorative, transparent laminate comprised of a thin, transparent layer of stone bonded to a transparent sheet of glass having a substantially flat surface, said method comprising the steps of:

working a stone to form a substantially flat surface thereon, said stone defining voids at said substantially flat surface thereon;

positioning an adhesive between the substantially flat surfaces of said sheet of glass and said stone;

bringing the substantially flat surfaces of said sheet of glass and said stone into engagement with said adhesive therebetween;

filling at least some of the voids with said adhesive;

after the steps of bringing the substantially flat surfaces of said sheet of glass and said stone into engagement and filling at least some of the voids with said adhesive, forming a bond between the substantially flat surfaces of said sheet of glass and said stone with said adhesive;

after the step of forming said bond, further working said stone to form said thin, transparent layer of stone by reducing the thickness of the stone and increasing the transparency of said stone;

after the step of working said stone, scoring said sheet of glass to form a score line in at least partial registry with said thin, transparent layer of stone and in a surface of said sheet of glass opposed to the substantially flat surface of the sheet of glass to which said thin, transparent layer is bonded; and exerting pressure on said glass at spaced locations thereon on opposed sides of said score line to substantially simultaneously break said sheet of glass and said thin, transparent layer of stone along said score line.

2. The method according to claim 1 wherein the step of further working said stone to reduce the thickness of said stone and increase the transparency of said stone includes the step of grinding said stone.

3. The method according to claim 1 wherein the step of further working said stone to reduce the thickness of said stone and increase the transparency of said stone includes the step of cutting said stone.

4. The method according to claim 1 additionally comprising the step of polishing said stone after the stone is further worked to reduce the thickness of said stone and increase the transparency of said stone.

5. The method according to claim 1 additionally comprising the step of adding a colorant to said adhesive prior to the step of positioning said adhesive between the substantially flat surfaces of said substrate material and said stone.

6. The method according to claim 1 wherein said adhesive is an ultraviolet light actuated adhesive, said method additionally comprising the step of drying said adhesive by exposing said adhesive to ultraviolet light while said adhesive is between and in engagement with said stone and said substrate material.

* * * * *